(12) United States Patent
Boury et al.

(10) Patent No.: US 8,919,649 B2
(45) Date of Patent: Dec. 30, 2014

(54) METHOD FOR THE DETECTION OF A MARKER AFFIXED TO THE SURFACE OF AN OBJECT AND SYSTEM FOR IMPLEMENTING SAME

(75) Inventors: Samuel Boury, Toulouse (FR); Olivier Mezzarobba, Corronsac (FR); Pierre Gurdjos, Ramonville St. Agne (FR); Vincent Charvillat, Saint Jean (FR)

(73) Assignee: Ubleam, Labege (FR)

( * ) Notice: Subject to any disclaimer, the term of this patent is extended or adjusted under 35 U.S.C. 154(b) by 29 days.

(21) Appl. No.: 13/992,820

(22) PCT Filed: Dec. 9, 2011

(86) PCT No.: PCT/FR2011/052932
§ 371 (c)(1),
(2), (4) Date: Sep. 25, 2013

(87) PCT Pub. No.: WO2012/076828
PCT Pub. Date: Jun. 14, 2012

(65) Prior Publication Data
US 2014/0008436 A1    Jan. 9, 2014

(30) Foreign Application Priority Data

Dec. 10, 2010  (FR) .................................... 10 60340

(51) Int. Cl.
*G06K 19/00* (2006.01)
*G06K 7/14* (2006.01)
*G06K 19/06* (2006.01)

(52) U.S. Cl.
CPC ................ *G06K 7/1443* (2013.01); *G06K 7/14* (2013.01); *G06K 7/1417* (2013.01); *G06K 7/1447* (2013.01); *G06K 7/1452* (2013.01); *G06K 7/1456* (2013.01); *G06K 19/06037* (2013.01)

USPC ............ 235/451; 235/435; 235/437; 235/439

(58) Field of Classification Search
USPC .......................... 235/435, 437, 439, 454, 462
See application file for complete search history.

(56) References Cited

U.S. PATENT DOCUMENTS

| 6,604,682 | B2 | 8/2003 | Wakamiya et al. |
| 2006/0055942 | A1* | 3/2006 | Krattiger ...................... 356/603 |
| 2009/0026269 | A1 | 1/2009 | Connell, II |

FOREIGN PATENT DOCUMENTS

EP        1 143 372        10/2001

OTHER PUBLICATIONS

International Search Report dated May 30, 2012, corresponding to PCT/FR2011/052932.

*Primary Examiner* — Matthew Mikels
(74) *Attorney, Agent, or Firm* — Young & Thompson

(57) ABSTRACT

A method for the detection of a marker affixed to the surface of an object, includes: acquiring a photographic image of a zone containing at least one marker; extracting contours from the photographic image; detecting a marker-positioning contour from among the aforementioned contours, which corresponds to a set of confocal conics having a predetermined form; modelling an image of the confocal conics in the form of a matrix having at least two symmetric matrices of order 3; analyzing the matrices in order to determine a perspective correction for the photographic image; detecting, in the perspective-corrected photographic image, an indexing element associated graphically with the positioning contour of the marker, and rotation-correcting the photographic image; detecting, in the perspective and rotation-corrected photographic image, encoded data graphically associated with the positioning contour of the marker, and decoding the encoded data. A marker-detection system using the method is also described.

19 Claims, 4 Drawing Sheets

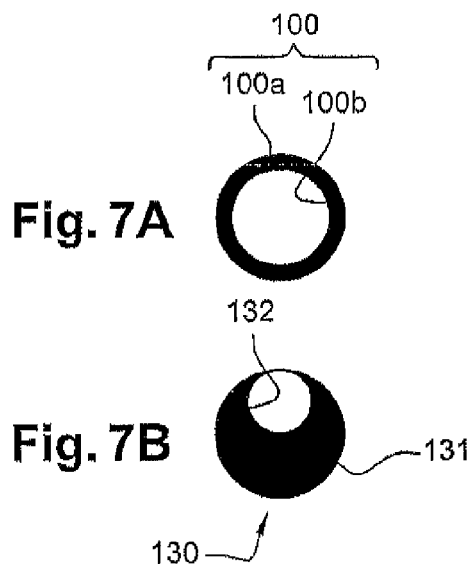
Fig. 7A
Fig. 7B
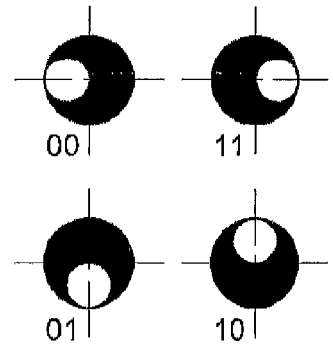
Fig. 7C
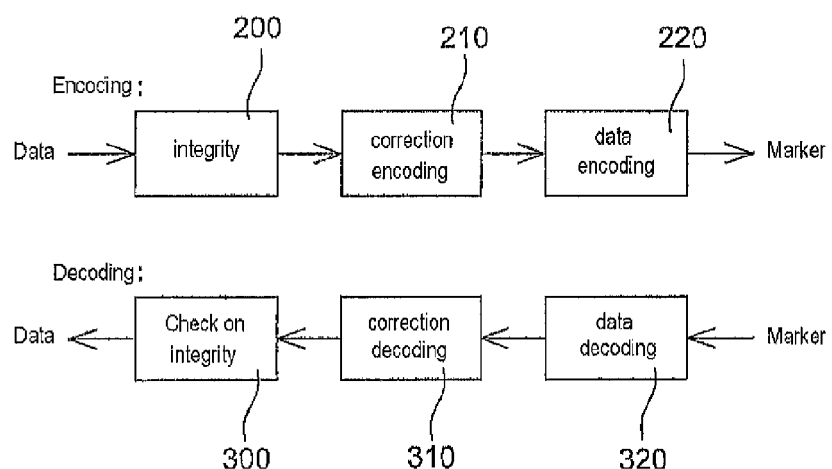
Fig. 8

METHOD FOR THE DETECTION OF A MARKER AFFIXED TO THE SURFACE OF AN OBJECT AND SYSTEM FOR IMPLEMENTING SAME

FIELD OF THE INVENTION

The invention pertains to a method for detecting a marker affixed to the surface of an object to enable this object to be identified and positioned relative to an acquisition device. The invention also pertains to a system for implementing this method of detection.

The invention can be applied in the field of the recognition of objects by means of a marker containing data specific to each object.

PRIOR ART

In the field of object recognition, it is frequent to affix a marker on each object to be recognized. This marker contains data specific to the object and is used to recognize and identify said object. At present, the markers most widely used are barcode markers. These barcode markers are stickers or labels, each one of which is to be glued to an object to be recognized, each being provided with a barcode. A barcode is an encoding of digital data in the form of a symbol constituted by bars and spaces, the thickness of which varies as a function of the data to be encoded. More specifically, a barcode is constituted by a predefined number of black or white vertical bars, each respectively encoding a binary 0 or a binary 1, a set of binary 0s and 1s representing a number as can be seen in FIG. 1. A barcode thus enables a number to be associated with an object, this number corresponding to data specific to said object. Classically, these pieces of specific data are a reference of the object, a price of the object etc.

These barcode markers, which are currently very widespread, have the drawback of being not only esthetically deficient but above all very difficult to read. Indeed, the barcodes are read by means of an optical reading terminal comprising an optical system for emitting a light beam, and an optical sensor. When reading a barcode marker, the reader terminal sends a light beam, generally low-powered, on to the barcode and then analyses the reflected light. Hence, to read a barcode marker, the operator responsible for reading these markers must present said marker before the optical unit of the reading terminal, perpendicularly to the light beam, so that the light beam can be reflected by the barcode. The operator must also present the barcode at a relatively short distance from the sensor so that the barcode totally enters a frame, the size of which is demarcated by the size of the optical sensor because the reading terminal comprises no self-calibration means.

Besides, as in most types of encoding, barcode encoding comprises pieces of redundant information. Indeed, in addition to the encoded information, a barcode comprises a piece of redundancy information to secure the reading of the information. If a barcode is badly positioned relative to an optical sensor, or if it is deformed because its support is too flexible, then the barcode is read only partially and it is therefore impossible to locate all the information contained in this barcode. There is therefore a loss of information.

It can be understood that a barcode marker can be read only if the barcode is placed accurately before the reading terminal. The reading of such barcode markers is therefore a relatively tedious and lengthy task since it requires that each barcode should be placed before the reading terminal. Thus, in the classic case of shopping in a supermarket, the cashier has to search for the barcode marker on each object purchased and then place it before the reading terminal since a wrongly positioned barcode marker will be incapable of being read.

It can be understood that, with such drawbacks, the use of the barcode markers is limited to the applications in which each object provided with a barcode marker can be taken separately from a set of objects so that the objects are placed one by one before the reading terminal.

SUMMARY OF THE INVENTION

The invention is aimed precisely at overcoming the drawbacks of the prior art set forth here above. To this end, the invention proposes a marker that can be read in different positions, even if the totality of the information contained by the marker is not directly readable by the reading terminal. The invention also proposes a method making it possible to read such a marker and, if need be, to reconstitute the missing information of the marker. To this end, the marker of the invention comprises a geometrically shaped contour for positioning that enables the detection of the marker in a scene containing said marker. The determining of this contour, associated with a locating or identifying of the marker in a reference system enables the entire marker, and therefore the information contained in the marker, to be reconstituted, even in the event of concealment or disturbed conditions. The invention therefore proposes the obtaining of a piece of information from an image signal.

More specifically, the invention pertains to a method for detecting a marker affixed to a surface of an object, characterized in that it comprises the following operations:
  a) acquisition of a photographic image of a scene containing a marker;
  b) reading the photographic image and detecting the marker in said scene, this detecting of the marker comprising:
    c) an extraction of contours in the photographic image, and
    d) a detection, among these contours, of a contour for positioning the marker corresponding to a set of coplanar conics of a predetermined shape,
  e) locating the contour for positioning the marker comprising:
    f) a modeling of an image of the coplanar conics in matrix form where each conic is represented by a third-order symmetrical matrix,
    g) an analysis of these matrices to determine a correction of perspective of the photographic image,
    h) a detection, in the perspective-corrected photographic image, of a fool-proofing element graphically associated with the contour for positioning the marker and a correction in rotation of the photographic image,
  i) detecting, in the perspective-corrected and rotation-corrected photographic image, encoded data graphically associated with the contour for positioning the marker and decoding these pieces of encoded data.

This method can comprise one or more of the following characteristics:
  the pieces of encoded data are situated inside the contour for positioning the marker.
  the pieces of encoded data are situated around the contour for positioning the marker.
  the contour for positioning the marker is constituted by a set of homofocal conics.
  the contour for positioning the marker is constituted by a set of coplanar circles.
  the contour for positioning the marker is a set of two concentric circles.

the decoding of the encoded data comprises the application of a luminance or chrominance decoding algorithm.

the decoding of the pieces of encoded data comprises the application of an algorithm for decoding by geometrical signatures.

the decoding of the pieces of encoded data comprises a search, in a database, for information associated with the decoded data.

the pieces of encoded data are formed by a set of conics.

The invention also pertains to a system for detecting a marker affixed to a surface of an object, characterized in that it comprises a reading terminal comprising:

an image-taking device capable of taking a photographic image of the scene containing at least one marker; and a unit for processing the photographic image capable of implementing the method described here above in detecting a contour for positioning the marker in the photographic image, in locating this contour for positioning in order to correct the photographic image in perspective and in rotation, and in decoding pieces of encoded data associated with the marker.

This system can comprise a database linked with the reading terminal and containing pieces of information associated with the pieces of encoded data contained in the marker.

BRIEF DESCRIPTION OF THE DRAWINGS

FIGS. 7A, 7B and 7C represent the encoding elements and the contour for positioning a marker according to the invention.

FIG. 8 represents a functional diagram of the encoding of the data and of the decoding of the data according to the invention.

DETAILED DESCRIPTION OF EMBODIMENTS OF THE INVENTION

The invention pertains to a method for detecting a marker affixed to the surface of an object and for reading data contained in said marker. This method consists first of all in making an image of the scene of the environment in which at least one marker is located. This scene, also called a zone, can be relatively vast. It is not necessarily a targeted zone around the marker. On the contrary, this scene can contain several markers. For example, this scene can be a supermarket trolley containing several articles, each with a marker according to the invention, and for which it is sought to evaluate the total price of the articles. This scene can also be a public place in which a crowd of individuals is moving, each with a marker according to the invention, and each of whose identities is sought to be known.

The method of the invention then consists in processing the part of the image containing this scene to detect a contour for positioning a marker, or locating pattern, and then processing the data contained inside or outside this contour for positioning. These operations for processing the image and the data are described in greater detail here below.

Figure 1:
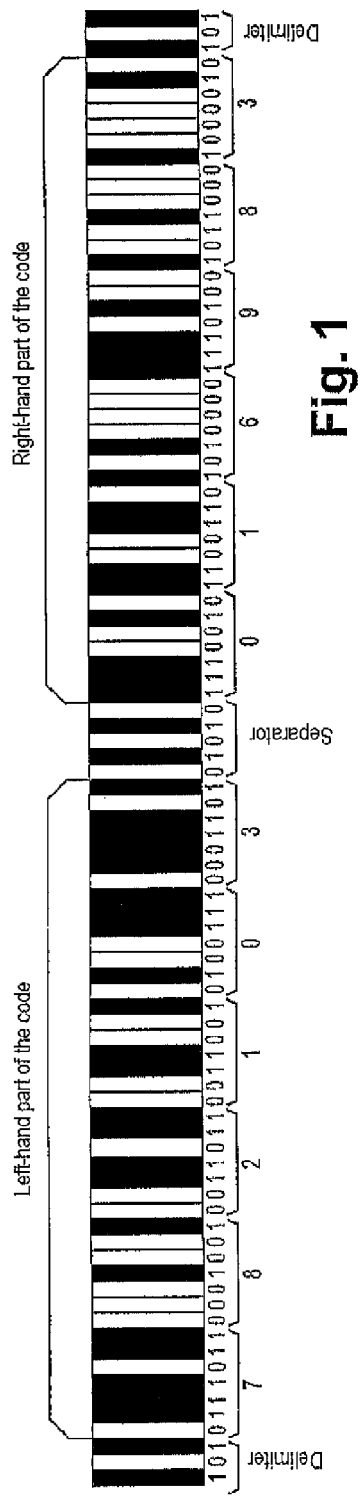
FIGS. 1 and 6c, already described, represent an example of a barcode marker according to the prior art.
Figure 2:
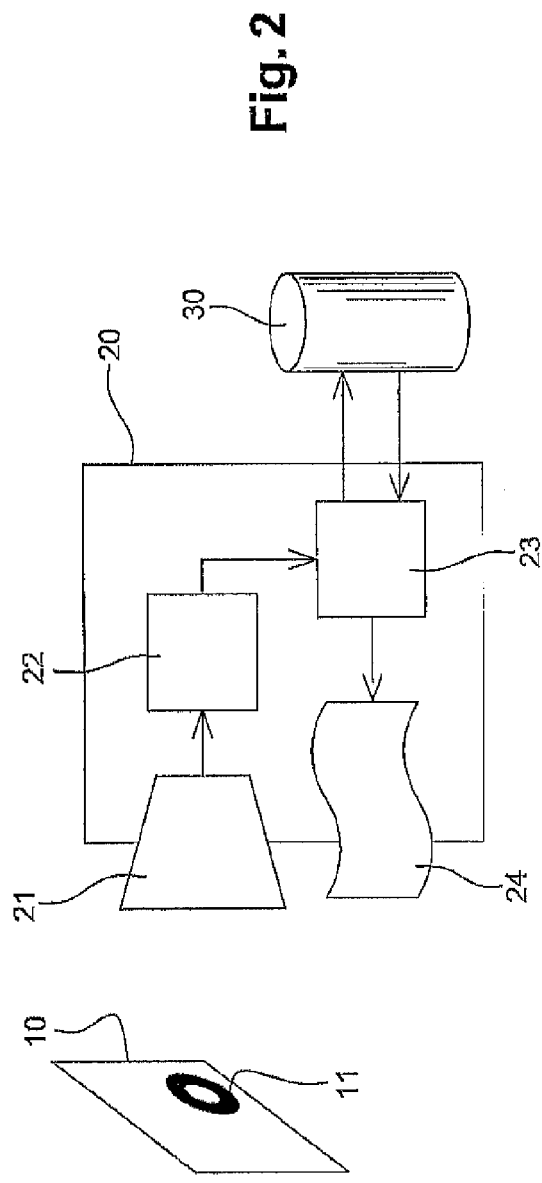
FIG. 2 schematically represents the system for detecting a marker according to the invention.

The method of the invention is implemented by a system for reading as represented schematically in FIG. 2. This system comprises a reading terminal 20 which detects and reads a marker 11 affixed to a object 10, such as a badge. This reading terminal 20 comprises an image-taking device 21 capable of taking an image of a scene containing at least one marker. The image-taking device 21, or photographic sensor, acquires an image of the scene. The image-taking device 21, or photographic sensor, acquires an image of the scene, whatever the orientation and the position of the marker in this scene. The reading terminal 20 also comprises an image-processing unit 22 which detects the marker in the image, and decodes data contained within the marker. The reading terminal 20 furthermore comprises a control unit 23 that manages the decoded data. To this end, the control unit 23 is connected firstly to an interface 20, for example a man/machine interface, and secondly to a database 30.

This database 30 can be distant from the reading terminal 20 and connected by cable or wireless (for example a Wi-Fi link) to the control unit 23. This database 30 contains information associated with the specific data contained in the marker.

The man/machine interface 24 can be a screen, for example associated with the keyboard, or a touch-sensitive screen on which the decoded data of the marker and/or information coming from the database 30 can be displayed.

Figure 3:
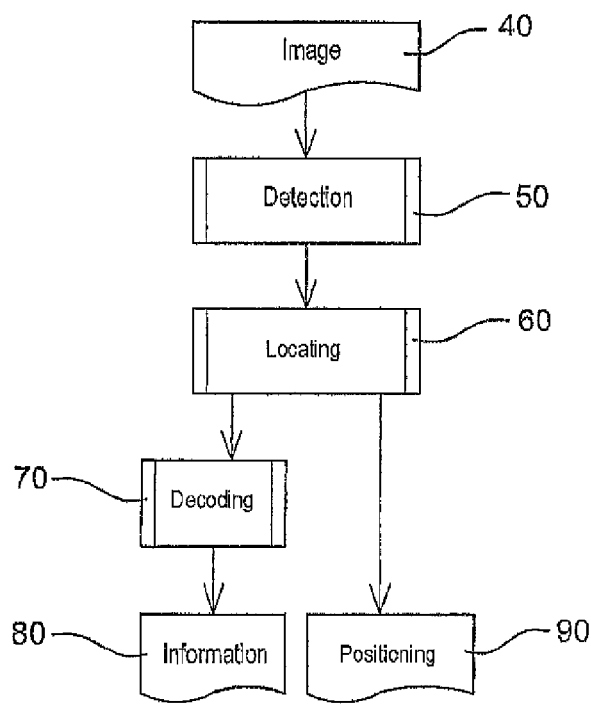
FIG. 3 represents a functional diagram of the method for detecting a marker according to the invention.

The method performed by this system is represented in the form of a functional diagram in FIG. 3. This diagram shows a first step 40 for acquiring a photographic image of a scene containing at least one marker. The photographic image can be obtained whatever the angle of view of the photographic sensor, within the limits of the characteristics of said sensor. Since this photographic image is an overall image of a scene, the marker can be positioned so as to be facing the photographic sensor or else in perspective or else at an end of the image (at the top, bottom, side etc). The environment of the marker can therefore be noisy. An image is considered to be noisy when the luminosity is low and the image is under-exposed or, on the contrary, when the luminosity is high and the image is over-exposed. An image is also noisy when it is blurred, when the marker is slanted or when it is distant in the zone of the image, etc.

The method of the invention then comprises a step 50 for reading and processing the photographic image of the scene in order to detect the marker in the image.

The marker used in the invention comprises:

a contour for positioning constituted by at least two coplanar conics from which a correction of perspective of the photographic image can be computed, and by a foolproofing element from which the orientation of the corrected image is determined, and encoded data graphically associated with the contour for positioning, and situated inside or outside the contour for positioning.

According to the invention, the coplanar conics can be homofocal or coplanar circles. In particular, homofocal conics can be ellipses, circles, hyperbolas, parabolas etc having a common focus.

The pieces of encoded data are data that can be encoded geometrically in the family of conics, (circles, hyperbolas, parabolas, ellipses), encoded in the form of the usual barcodes (EAN 13), graphic figures (logos), alphanumeric characters, etc.

To detect a marker, the method of the invention consists in detecting the contour for positioning the marker. According to the invention, the contour of the marker is the contour of a set of coplanar conics observed in perspective. In one preferred embodiment of the invention, the contour for positioning the marker is constituted by two concentric circles, the inter-circle zone of which can be shaded or colored so as to form a sort of ring.

The method of the invention therefore proposes to extract the contours from the photographic image, i.e. the contours of all the elements (including the marker) contained in said photographic image and then to detect, among all the contours, that contour for positioning the marker which reduces the photographic image to a region of interest, also called an ROI, corresponding to the zone of the photographic image situated around the marker.

Extracting the contours from the ROI can be done, for example, by means of a dedicated Sobel or Canny algorithm. It is then possible to improve the contrasts and luminosity by standardizing this ROI.

The contour for positioning the marker is then detected by making a search, from among the extracted contours, for a set of coplanar conics of predetermined shape observed in perspective, this set of coplanar conics being the contour for positioning the marker.

This detection of the contour for positioning the marker can be done by applying a detector of the primitives of these conics, for example an ellipse, on a plane using, for example, a Hough transform coupled with a fitting of the conic to data by the least error squares method. Any method for detecting the contours, even partial contours, can be applied. In the preferred embodiment where the contour for positioning is ring-shaped, the detected primitives are ellipses.

The method then consists selecting the best candidate, among all the primitives, according to a predefined criterion. In our preferred embodiment where the contour for positioning is ring-shaped, two ellipses are selected having characteristics close to those of two concentric circles observed in perspective (the centers of the ellipses are proximate). By determining the projections of primitives, it is possible to know the contour for positioning the marker on the photographic image.

At the end of this detection, the geometrical signatures, based on the analysis of the matrices representing the selected primitives, i.e. the conics, are used to carry out the step 60 for locating the contour for positioning the marker on the photographic image.

This step 60 for locating the contour for positioning the marker 60 enables the photographic image to be corrected in perspective and in rotation. This step for locating 60 provides a piece of information on location o*r positioning of the marker in a referential system, such as the referential system of the image-taking device. This step 60 more specifically consists in estimating the homographic transformation of the primitives linking the real plane to the image plane of the marker, processed as projective planes.

Figure 4:
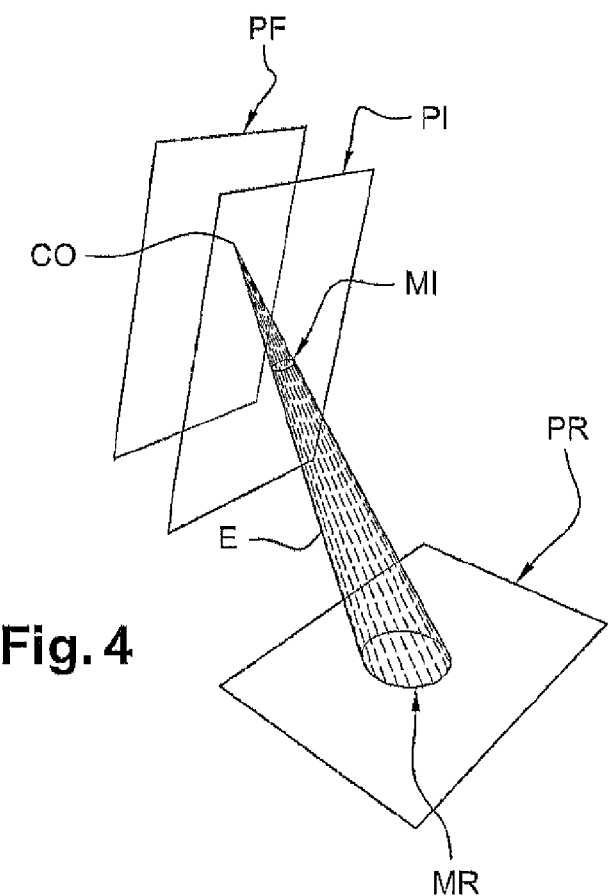
FIG. 4 represents the geometry of the imaging for a marker assuming the use of a pinhole model.

FIG. 4 shows an example of the real and image planes during a homographic transformation. This FIG. 4 shows:
the focal plane PF which corresponds to the plane parallel to the image plane and containing the optical centre CO of the photographic sensor,
the image plane PI which corresponds to the plane of the scene containing the image of the marker MI, and
the real plane PR which corresponds to the plane of the scene containing the real marker MR.

This FIG. 4 also represents the elliptical cone E whose vertex is the centre CO of the photographic sensor and is tangential to the contour for positioning the marker. It is thus shown that the contour of the marker in the image plane is an ellipse while the contour of the marker in the real plane is circular.

With the aim of correcting the image plane PI in perspective so that the contour for positioning the marker in the image plane PI thus corrected is identical to that of the real plane PR, plus or minus a 2D rotation, it is sought to estimate a homography H achieving a bijection between the image plane PI and the real plane PR.

The homography H is represented by a third-order homogeneous matrix. This matrix H can be computed by means of the singular value decomposition (SVD) of the third-order and second-rank matrix of a conic of the projective plane, here below denoted as CTA and called a 2D absolute tangential conic. CTA is a remarkable conic of the real plane PR for which it is sought to estimate the projection in the image plane.

When generating a marker according to the invention, a contour of this marker is chosen. This is a marker that can preferably be easily detectable. To this end, it is possible to choose a contour for positioning that is sufficiently under constraint to give rise to only one solution.

The method of the invention therefore proposes to model the image of the conics corresponding to the contour for positioning the marker in a matrix form M1, M2, where M1 and M2 are two third-order homogeneous matrices representing the two conics and to use the properties of the conics to consider that there is a linear combination of the matrices M1 and M2 equal to CTA, plus or minus a multiplier scale factor. In other words, there is a scalar s such that CTA~M1+s*M2, where the operator ~ signifies "equal, plus or minus a multiplier scale factor".

The scalar s can be determined from an algebraic analysis of the matrices M1 and M2, in resolving a problem of computation of the generalized eigenvalues of the pair (M1, M2), for which a non-ambiguous solution is explained. H is computed by singular value decomposition (SVD) of the matrix CTA thus obtained.

In the preferred embodiment where the contour for positioning is ring-shaped, the radius ratio between the two concentric circles forming the ring is known or not known. The points of these circles are projected in the image plane on two conics, namely ellipses, represented by their respective matrices M1 and M2 for which a point of the ellipse i meets the equation $x^T \times M_i \times x = 0$ where x is the vector of homogeneous coordinates of this point. An optimized way to compute the homographic matrix H from computations of generalized eigenvalues of M1 and M2 is described in the IEEE publication, <<Geometric and algebraic constraints of projected concentric circles and their applications to camera calibration>>.

It must be noted that computing the parameters of the correction of perspective of the photographic image also enables the calibration of the image-taking device 21, according to a simplified pinhole model.

The analysis of the matrices M1 and M2 thus makes it possible to determine a correction of perspective of the photographic image. It is then possible to correct the perspective of the photographic image to obtain a perspective-corrected photographic image enabling accurate reading of the marker.

However, this correction of perspective is obtained plus or minus a 2D rotation. The method of the invention then proposes to correct the rotation of this perspective-corrected image corrected by detecting, in the perspective-corrected image, a fool-proofing element graphically associated with the contour for positioning the marker.

Figure 5:
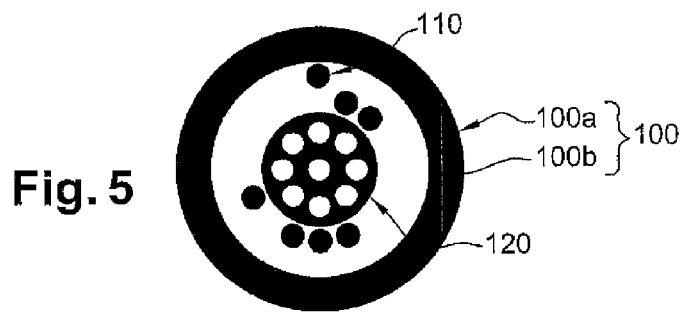
FIG. 5 represents an example of a marker according to one embodiment of the invention.

Indeed, in the preferred embodiment, since the circles are concentric, an ambiguity of rotation can persist at the end of the homographic computation. The method of the invention then proposes to add a reference point forming a fool-proofing element. This guide element constitutes one of the geometric signatures of the primitives of the contour for positioning during the step for locating said contour for positioning. It is used to compute the rotation to be applied to the perspective-corrected photographic image to obtain a perspective-corrected and rotation-corrected photographic image on which the marker can be read without ambiguity. This fool-proofing element can be a particular point such as a round dot, placed at a particular place relative to the contour for positioning, i.e. relative to the concentric circles of the marker. An example of a marker equipped with such a fool-proofing element is shown in FIG. 5. In this example, the marker comprises two concentric circles 100a and 100b forming a ring 100. The concentric circle 100a has a radius smaller than that of the concentric circle 100b. The marker also has a fool-proofing element 110, or corner fool-proofing element. This corner fool-proofing element is a round-shaped element placed so as to be off-centered relative to the encoded data 120, in proximity to the concentric circle of smaller radius 100a. In this example, the fool-proofing element 110 is a round and black dot; it could also have the shape of a circle or any other geometrical shape that is easily dissociable from the encoded data, thus enabling it to be detected without ambiguity. In the example of FIG. 5, the fool-proofing element has a shape substantially identical to that of the encoded data 120 but its location is sufficiently off-centered for it to be detected without ambiguity. By carrying out the detection of this fool-proofing element, for example by correlation, a matrix of rotation is computed and then multiplied with the homographic matrix to form a total homographic matrix.

It must be noted that computing the perspective-correction parameters for the photographic image can also make it possible to determine the 3D orientation of the image-taking device 21 relative to the plane of the marker.

It can be understood from the above that the reconstruction of the data contained in the marker can be done in disturbed conditions such as over-exposure or under-exposure to light, a distant or slanted viewpoint, camera shake, focusing blur, partial concealment etc. Indeed, determining the contour for positioning associated with a location of the marker in a referential system, for example the referential system of the image-taking device, makes it possible to recompose the entire marker when a part of it is missing in the photographic image and thus to retrieve all the information without any problem of concealment or of disturbed conditions.

Furthermore, since the processing of images used in the method for detecting of the invention is rapid, since the homographic computation is restricted and since computation by singular value decomposition has low algorithmic complexity, the detection of the markers is fast and efficient.

As can be seen in FIG. 3, the method of the invention then comprises a step 74 for decoding the information contained in the encoded data of the marker. Indeed, the marker of the invention comprises, in addition to its contour for positioning and the fool-proofing element, the encoded data placed inside or outside the contour for positioning, according to a geometry predetermined by the type of encoding. This decoding step consists of the application of a decoding algorithm to decode the digital data encoded in the marker. A functional diagram showing the different steps of the decoding is represented in FIG. 8. This diagram shows that the step 70 comprises an operation 320 for decoding the data read on the marker, and then an operation 310 for decoding the values of correction of the data and then an operation 300 for verifying the integrity of the data.

The step 70 can comprise a homographic transformation before the decoding of the information. This homographic transformation, known as an inverse transformation, serves to back-project the image onto the real plane. The usual techniques of interpolation can be used in case of expansion of the image. The image obtained can also be standardized to favor the reading of the encoded data.

Several types of encoding can be used to encode the data of the marker of the invention. Whatever the type of encoding used, a piece of data is encoded in following the operations of the functional diagram shown in FIG. 8: an operation 200 for applying integrity to the data is first of all performed, followed by an operation 210 for encoding correction data, and then an operation 220 for encoding the piece of data itself. Once encoded, the piece of data can be applied to the marker.

The encoding can be an encoding specific to the marker of the invention or, on the contrary, a non-specific encoding used for other markers. The pieces of data contained in the marker can also be encoded by the components of an image.

Figure 6A:
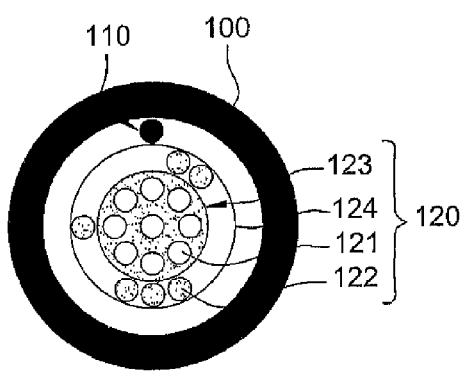
FIGS. 6A, 6B, 6D, 6E and 6H represent different examples of markers according to the invention.
Figure 6B:
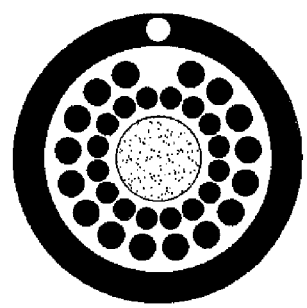

As examples of non-specific encoding, it is possible to cite, for example, luminance or chrominance encoding. In such an encoding, each piece of data is encoded in the form of points or clusters of points, the binary value of which is represented by a color or a grey level. An example of a marker in which the pieces of data are luminance encoded is the barrel code shown in FIG. 6A. In this example, the information is carried by a value of the luminance at the centre of the circles: certain pieces of data are encoded by blank points 121 at the centre of a shaded circle 123; other pieces of data are encoded by shaded dots 122 inside a blank circle 124. Another example of a marker comprising data encoded according to the barrel code is shown in FIG. 6B.

With such encoding, the step 70 of the method of the invention can comprise an additional operation for thresholding the image, this thresholding offering an optimum reading of the dominant value in luminance at the center of the circles. In this case, a 24-bit piece of binary information is extracted and decoded and/or corrected by a Golay, BCH or Reed Solomon type of error corrector code. The information obtained at output of the decoding algorithm is then a piece of corrected information.

Figure 6C:

As non-specific encoding, we can also cite certain forms of encoding by geometric signatures such as barcodes shown in FIG. 6C.

Other forms of encoding by geometrical signatures specific to the invention can be, for example, encoding by off-centered circles, also called necklace encoding, or an encoding by centered signals, also called flower encoding.

According to a preferred embodiment of the invention, the pieces of encoded data are formed by a set of conics. For example, the pieces of encoded data can be circles, centered or off-centered relative to one another, as can be seen in the FIG. 6.

As can be seen in FIG. 7B, in the encoding by off-centered circles, each piece of digital data is encoded by means of two off-centered circles, or off-centered discs, forming an encoding element 130. This encoding element 130 comprises a shaded disk 131 with a radius R and a blank disc 132 with a radius R/2. The blank disc 132 is placed inside the shaded circle 131, in a manner that is off-centered relative to the shaded disc 131. The location of the blank disc in the shaded disc determines the binary value of the encoding element. Examples of binary values of the encoding elements are shown in FIG. 7C, described in greater detail here below. The encoding element can also have different dimensions, the dimension of this encoding element determining the redundancy bits for the protection of the data.

According to this encoding by off-centered circles, the encoding pattern, called a sequence, is formed at most by six encoding elements 130 placed around or inside the contour for positioning the marker 100. An example of such a contour for positioning is shown in FIG. 7A. As explained here above, this contour for positioning 100 comprises an external circle 100a and an internal circle 100b, that are concentric. The external circle 100a can have a diameter of 60 relative units and the internal circle 100b can have a diameter of 45 relative units.

As can be seen in FIG. 7C, the position of the blank disc in the shaded disc indicates a binary value. For example, if S denotes a piece of 24-bit data to be encoded according to an encoding in off-centered circles, S is represented in the form:

$$S = a_0 a_1 \ldots a_{11} b_0 b_1 \ldots b_{11},$$

where the values $a_i$ can be redundancy bits linked to a systematic error correction code and the $b_i$ values represent information payload bits. For each value i ranging from 0 to 5, the building of the marker consists in adding a pattern $M_i$ based on:

the value of $a_{2i} a_{2i+1}$ according to the following rule:
00=>R=40;
01=>R=35;
11=>R=30;
10=>R=25; and
the position of the blank disc in the shaded disc, as a function of the value of $b_{2i} b_{2i+1}$ according to the rule shown in FIG. 7C.

The pattern $M_i$ is inserted in the counter-clockwise sense, after $M_{i-1}$ around or inside the contour for positioning the marker.

Such an encoding by off-centered circles has the advantage of encoding pieces of data on 24 bits with 12 payload bits, thus enabling an encoding of 4096 words.

Figure 6D:
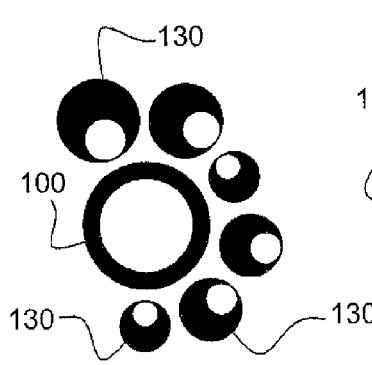
Figure 6E:
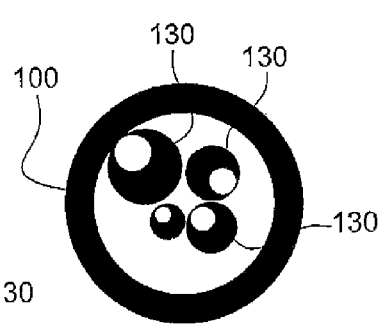

FIGS. 6D and 6E show two examples of encoding by off-centered circles according to the invention. In the example of FIG. 6D, the encoding elements 130 described here above are distributed around the contour for positioning 100. In the example of FIG. 6E, the encoding elements 130 are distributed within the contour for positioning 100.

Figure 6H:
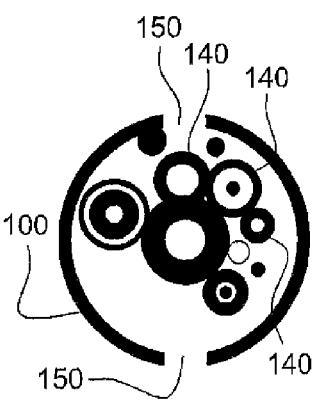

FIG. 6H shows an example of encoding by centered circles In this example, the pieces of data are encoded in sets of one or more circles of different grey levels, for example shaded circles and blank circles, centered in one another and forming encoding elements 140. These encoding elements 140 are distributed inside a contour for positioning 100. In one variant, the encoding elements are placed around the contour for positioning. In the example of FIG. 6H, the fool-proofing element is made by means of two apertures 150 in the contour for positioning, facing each other.

It can be understood that, in the method of the invention, the encoded data are decoded by applying a decoding algorithm depending on the type of encoding used. For example, pieces of data encoded by geometrical signatures will be decoded by applying an algorithm of decoding by geometrical signatures.

Once the decoding step 70 is terminated, the pieces of digital data contained in the marker are decoded and therefore readable. These pieces of digital data can then be used directly. They can also be used to search for information associated with these pieces of data. As explained here above, these pieces of information, referenced 80 in FIG. 3, can be searched for in a database, in using the piece of decoded digital data as a link. For example, the piece of decoded digital data can be associated with information on the identity of an individual, the price of an article, a GPS location, etc.

A method has just been described for detecting and decoding a marker according to the invention. From this description, a method can be deduced for generating a marker of this kind. Indeed, a marker according to the invention is generated by choosing a shape of the contour for positioning the marker from a family of coplanar conics, and then by determining a fool-proofing element and inserting this fool-proofing element in the marker. A type of encoding must then be chosen to encode the digital data deterministically and non-ambiguously. The digital data as well as the redundancy bits are then encoded and placed around the contour for positioning, or inside said contour, as a function of the encoding chosen. This placing of the encoding elements can be achieved according to a random or personalized arrangement (as in the case of the encoding by off-centered circle). The method for generating the marker according to the invention makes it possible to obtain markers having a visually pleasant graphic presentation. Hence, the marker of the invention can be set up in visible locations such as advertising panels, logos, badges, etc. The esthetic features of the marker of the invention thus offer a large choice of applications.

Furthermore, since this marker is easy to detect whatever the environmental conditions, it can be positioned at a distance from the reader terminal. For example, a marker with a 5-cm diameter can be detected and read at a distance of the order of 4 m; a marker with a 30-cm diameter can be detected and read at a distance of the order of 10 to 12 m.

Thus, a marker according to the invention can be used, for example, to sign or tag objects or points of interest, for example in a museum, and furnish services or information associated with these objects or points of interest. It can also be used to furnish absolute positioning reference points, for example for a geolocalized navigation function. It can also serve as a relative positioning reference point, for example to superimpose virtual 3D information elements on real elements filmed and displayed on a screen.

The method described in this invention provides particular performance characteristics such as:
a flexibility: the knowledge of qualitative information on the conics (e.g. knowing that they are homofocal ellipses) is sufficient to enable a correction of the perspective of the photographic image;
robustness under partial concealment of the positioning contour: a part of the conic is enough to model it in matrix form;
robustness under deformation of the support (curvature): the observation made of the deformed conic on the support makes it possible to model and correct the deformation effect. Thus, the method, based on the geometrical properties of the contour for positioning the marker, makes it possible to correct not only the perspective inherent in the imaging but also a deformation by curved folding of the support to which the marker is applied, for example when the marker is affixed to a textile.
robustness under remoteness: the detection of a few points of the contour makes it possible to reliably detect the contour for positioning and then to correct the problems of observation. In the preferred embodiment, if the detection of the contour for positioning is done only on some points of an arc of an ellipse, this will suffice to reconstitute the ellipse for detecting the contour for positioning;
robustness under very close observation: the correction of perspective makes it possible to calibrate the camera according to a simplified pinhole model (focal distance, rectangular format pixel).

The invention claimed is:

1. Method for detecting a marker affixed to a surface of an object, characterized in that it comprises the following operations:
   a) acquisition (40) of a photographic image of a scene containing a marker (11);
   b) reading the photographic image and detecting (50) the marker in said scene, this detecting of the marker comprising:
   c) an extraction of contours in the photographic image, and
   d) a detection, among these contours, of a contour for positioning the marker corresponding to a set of coplanar conics of a predetermined shape,
   e) locating (60) the contour for positioning the marker comprising:
   f) a modeling of an image of the coplanar conics in matrix form where each conic is represented by a third-order symmetrical matrix,
   g) an analysis of these matrices to determine a correction of perspective of the photographic image,
   h) a detection, in the perspective-corrected photographic image, of a fool-proofing element graphically associated with the contour for positioning the marker and correction in rotation of the photographic image,
   i) detecting, in the perspective-corrected and rotation-corrected photographic image, pieces of encoded data graphically associated with the contour for positioning the marker and decoding (70) these pieces of encoded data.

2. Method for detecting according to claim 1, characterized in that the pieces of encoded data are situated inside the contour for positioning the marker.

3. Method for detecting according to claim 1, characterized in that the pieces of encoded data are situated around the contour for positioning the marker.

4. Method for detecting according to claim 1 characterized in that the contour for positioning the marker is constituted by a set of homofocal conics.

5. Method for detecting according to claim 1, characterized in that the contour for positioning the marker is constituted by a set of coplanar circles.

6. Method for detecting according to claim 1, characterized in that the contour for positioning the marker is a set (100) of two concentric circles (100a, 100b).

7. Method for detecting according to claim 1, characterized in that the decoding of the encoded data comprises the application of a luminance or chrominance decoding algorithm.

8. Method for detecting according to claim 1, characterized in that the decoding of the pieces of encoded data comprises the application of an algorithm for decoding by geometrical signatures.

9. Method for detecting according to claim 1, characterized in that the decoding of the pieces of encoded data comprises a search, in a database (30), for information associated with the decoded data.

10. Method for detecting according to claim 1, characterized in that the pieces of encoded data are formed by a set of conics.

11. System for detecting a marker affixed to a surface of an object, characterized in that it comprises a reading terminal (20) comprising:
   an image-taking device capable of taking a photographic image of the scene containing at least one marker; and
   a unit for processing (22) the photographic image capable of implementing the method according to claim 1 in detecting a contour for positioning the marker in the photographic image, in locating this contour for positioning in order to correct the photographic image in perspective and in rotation, and in decoding pieces of encoded data associated with the marker.

12. System according to claim 11, characterized in that it comprises a database (30) linked with the reading terminal and containing pieces of information associated with the pieces of encoded data contained in the marker.

13. Method for detecting according to claim 2, characterized in that the pieces of encoded data are situated around the contour for positioning the marker.

14. Method for detecting according to claim 2, characterized in that the contour for positioning the marker is constituted by a set of homofocal conics.

15. Method for detecting according to claim 3, characterized in that the contour for positioning the marker is constituted by a set of homofocal conics.

16. Method for detecting according to claim 2, characterized in that the contour for positioning the marker is constituted by a set of coplanar circles.

17. Method for detecting according to claim 3, characterized in that the contour for positioning the marker is constituted by a set of coplanar circles.

18. Method for detecting according to claim 2, characterized in that the contour for positioning the marker is a set (100) of two concentric circles (100a, 100b).

19. Method for detecting according to claim 3, characterized in that the contour for positioning the marker is a set (100) of two concentric circles (100a, 100b).

* * * * *